US008463506B2

(12) United States Patent
Yanagi et al.

(10) Patent No.: US 8,463,506 B2
(45) Date of Patent: Jun. 11, 2013

(54) REAR WHEEL TOE ANGLE CONTROL SYSTEM

(75) Inventors: Takashi Yanagi, Saitama (JP); Akiyoshi Kobayashi, Saitama (JP); Shogo Nishizawa, Saitama (JP); Yutaka Horiuchi, Saitama (JP); Kohei Maruyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/254,357

(22) PCT Filed: Mar. 9, 2010

(86) PCT No.: PCT/JP2010/001664
§ 371 (c)(1),
(2), (4) Date: Sep. 1, 2011

(87) PCT Pub. No.: WO2010/103810
PCT Pub. Date: Sep. 16, 2010

(65) Prior Publication Data
US 2011/0313624 A1 Dec. 22, 2011

(30) Foreign Application Priority Data

Mar. 10, 2009 (JP) ................................. 2009-056053
Mar. 30, 2009 (JP) ................................. 2009-082771

(51) Int. Cl.
*G06F 7/00* (2006.01)
(52) U.S. Cl.
USPC ......... 701/49; 701/39; 280/5.521; 280/5.522; 280/11.204; 280/11.231; 280/11.212; 180/411; 180/412; 188/5; 188/17; 188/72.4; 188/24.21; 188/24.22

(58) Field of Classification Search
USPC .......... 701/37, 49; 280/5.521, 5.522, 11.204, 280/11.231, 11.212, 11.214, 11.216, 11.221, 280/86.75, 86.751, 86.758, 93; 180/411, 180/412; 188/5, 17, 72.4, 24.21, 24.22, 29
See application file for complete search history.

(56) References Cited

U.S. PATENT DOCUMENTS 6,033,041 A * 3/2000 Koga et al. .................... 303/152
6,792,916 B2 * 9/2004 Oashi ............................ 123/446
(Continued)

FOREIGN PATENT DOCUMENTS

EP   1 892 179 A1   2/2008
JP   5-178231 A     7/1993
(Continued)

*Primary Examiner* — McDieunel Marc
(74) *Attorney, Agent, or Firm* — Carrier Blackman & Associates, P.C.; Joseph P. Carrier; William D. Blackman

(57) ABSTRACT

Provided is a rear wheel toe angle control system that can prevent the impairment of the tracking performance of the electric actuator and enable the rear wheel toe angle control system to ensure the stability of the vehicle even when the electric actuator for steering the rear wheel according to the operating condition of the vehicle is subjected to an axial force. An ECU (12) serving as a rear wheel toe angle control unit for variably controlling the rear wheel toe angle ($\delta r$) of the motor vehicle (V) by using an electric actuator (11) is provided with a duty ratio correcting unit (25) that corrects the target duty ratio (Dtgt) for achieving the target rear wheel toe angle ($\delta rtgt$) according to the load condition of the electric actuator (11) that depends on the lateral acceleration (Gy) of the motor vehicle (V).

9 Claims, 9 Drawing Sheets

U.S. PATENT DOCUMENTS

| | | | |
|---|---|---|---|
| 7,356,400 B2 * | 4/2008 | Honma et al. | 701/67 |
| 7,613,557 B2 * | 11/2009 | Iyoda | 701/48 |
| 7,766,345 B2 | 8/2010 | Hakui et al. | |
| 8,050,819 B2 * | 11/2011 | Suyama et al. | 701/37 |
| 8,180,547 B2 * | 5/2012 | Prasad et al. | 701/71 |
| 2008/0021614 A1 * | 1/2008 | Endo et al. | 701/41 |
| 2008/0054577 A1 | 3/2008 | Horiuchi | |
| 2008/0114515 A1 * | 5/2008 | Hara | 701/42 |

FOREIGN PATENT DOCUMENTS

| | | |
|---|---|---|
| JP | 9-030438 A | 2/1997 |
| JP | 11-321685 A | 11/1999 |
| JP | 2002-137749 A | 5/2002 |
| JP | 2005-170276 A | 6/2005 |
| JP | 2006-062505 A | 3/2006 |
| JP | 2006-111099 A | 4/2006 |
| JP | 2006-160005 A | 6/2006 |
| JP | 2006-299810 A | 11/2006 |
| JP | 2008-055921 A | 3/2008 |
| JP | 2008-164017 A | 7/2008 |
| JP | 2008-221996 A | 9/2008 |
| JP | 2008-280027 A | 11/2008 |

* cited by examiner

REAR WHEEL TOE ANGLE CONTROL SYSTEM

TECHNICAL FIELD

The present invention relates to a rear wheel toe angle control system that controls a rear wheel toe angle of a vehicle by using a rear wheel toe angle variable control unit according to the behavior of the vehicle.

BACKGROUND OF THE INVENTION

As addressed in JP05-178231A (hereinafter "Patent Document 1"), in a rear wheel steering system that steers the left and right rear wheels in a symmetric manner by laterally displaying the left and right suspension arms, to steer the rear wheels into a toe-in state depending on the dynamic condition of the vehicle such as the vehicle speed, front wheel steering angle and braking state, and change the toe-in angle in a progressive manner depending on the vehicle speed and front wheel steering angle. According to this technology, the turning capability of the vehicle may be improved in low speed range, and the stability of the vehicle can be improved in high speed range. Also, the tail swaying tendency of the vehicle during a turn and the reduction in the stability of the vehicle under a brake can be effectively prevented.

More recently, with the aim of improving the turning capability and the stability of the vehicle, various four wheel steering vehicles incorporated with a rear wheel toe angle varying device that allows the rear wheel toe angle to be individually changed have been developed. The rear wheel toe angle varying device may be constructed in a number of different ways. An electric actuator may be interposed between the vehicle body and a lateral link or a trailing link of the suspension system supporting each rear wheel as disclosed in JP09-30438A (hereinafter "Patent Document 2"). In a double wishbone suspension system, a knuckle which is supported by the vehicle body via an upper arm and a lower arm using a ball joint in each of the arms may be additionally connected to the vehicle body via an electric actuator as disclosed in JP2008-164017A (hereinafter "Patent Document 3"). In any of such rear wheel toe angle varying devices, the toe angle of each rear wheel can be variably and individually controlled.

A typical electric actuator for a rear wheel toe angle varying device consists of a linear actuator using an electric motor and a feed screw mechanism. The present applicant previously proposed an invention for preventing the inadvertent detachment of an output rod without increasing the size of the linear actuator (patent document 3). When a vehicle component is driven by such an electric actuator, a static friction is caused between the male thread and female thread of the feed screw mechanism, and this static friction impairs the tracking performance of the electric actuator when the actuator is operated from a stand still condition. To overcome the static resistance and improve the tracking performance of the linear actuator, it may be possible to increase the duty ratio of a PWM controlled electric actuator when starting the action of the actuator. Also, JP2006-299810A (hereinafter "Patent Document 4") describes a drive motor for driving a cooling fan.

BRIEF SUMMARY OF THE INVENTION

Task to be Accomplished by the Invention

However, as the electric actuator for the rear wheel toe angle variable control system is interposed between the vehicle body and a suspension member, the axial force of the electric actuator may change depending on the running condition of the vehicle, and the change in the axial force in turn changes the maximum static frictional force. Therefore, even if the duty ratio in the PWM control is great enough for the electric actuator to overcome the maximum static frictional force at the time of start up, when the electric actuator is subjected to a large axial force such as when the vehicle is cornering, the output of the electric actuator may be great enough to start moving or there may be some delay in the response of the electric actuator.

In a vehicle equipped with a rear wheel toe angle variable control system, the actual rear wheel toe angle is controlled so as to track a target rear wheel toe angle computed from the front wheel steering angle and vehicle speed. Typically, this control action consists of a PID feedback control based on the deviation between the actual rear wheel toe angle and target rear wheel toe angle, and this deviation determines the input voltage for the electric actuator. This input voltage is PWM controlled in driving the electric motor. However, when the vehicle makes a turn, the electric actuator is subjected to an axial force, and this may impair the tracking performance of the electric actuator.

The present invention was made in view of such problems of the prior art, and has a primary object to provide a rear wheel toe angle control system that can prevent the impairment of the tracking performance of the electric actuator and enable the rear wheel toe angle control system to ensure the stability of the vehicle even when the electric actuator for steering the rear wheels according to the operating condition of the vehicle is subjected to an axial force.

Means to Accomplished the Task

To achieve such objects, the present invention provides a rear wheel toe angle control system (12) for changing a rear wheel toe angle ($\delta r$) of a vehicle (V) by using an electric actuator (11), comprising: a target rear wheel toe angle setting unit (21) for setting a target rear wheel toe angle ($\delta rtgt$); an actual rear wheel toe angle detecting unit (17) for detecting an actual rear wheel toe angle ($\delta ract$); a drive control unit (22, 124) that drives the electric actuator by a control value (D) based on a difference (e) between the target rear wheel toe angle ($\delta rtgt$) and actual rear wheel toe angle ($\delta ract$); a load detecting unit (24, 123) for detecting load acting upon the electric actuator; and a correcting unit (25, 120) for correcting the control value according to the load acting on the electric actuator.

According to the present invention, even when the load on the electric actuator changes depending on the running condition of the vehicle, as the control value for the electric actuator is boosted by the correcting unit, the tracking performance of the electric actuator is prevented from being impaired.

According to a certain aspect of the present invention, the electric actuator includes an electric motor (37) and a power transmission mechanism (39), and the correcting unit is configured to correct the control value so that an output (F) of the electric motor is greater than a maximum static frictional force (Ffmax) of the power transmission mechanism that depends on the load acting on the electric motor (Dcmd>Ds). Thereby, the even when the maximum static frictional force of the power transmission mechanism increases owing to the running condition of the vehicle, the response property of the electric actuator is prevented from being impaired. Therefore, the vehicle motion can be stabilized without regard to the running condition of the vehicle.

According to another aspect of the present invention, the electric actuator consists of a linear actuator including a feed screw mechanism (39), and an axial force detector (16) for detecting an axial force (Fa) of the electric actuator is provided on the electric actuator, the load detecting unit (24) being configured to detect the load (Ffmax) of the electric actuator from the axial force of the electric actuator. The use of the linear actuator allows the power transmission mechanism to be minimized in size, and the load of the electric actuator can be directly obtained from the axial force of the electric actuator by taking into account the configuration of the power transmission mechanism.

According to yet another aspect of the present invention, the axial force detector is configured to detect at least one of a lateral acceleration (Gy) of a vehicle body, a fore and aft acceleration (Gx) of the vehicle body, a vehicle speed (v) and a road surface condition (μ). In this arrangement, the maximum frictional force of the feed screw mechanism or the target control value that is required for the electric actuator to start off can be estimated, and the precision in the estimation of the maximum frictional force can be increased by using two or more of these parameters.

According to yet another embodiment of the present invention, the control value comprises a duty ratio for PWM control. Thereby, a highly responsive rear wheel toe angle control can be achieved in a vehicle provided with a DC power source.

According to yet another embodiment of the present invention, the correcting unit is configured to correct the control value over a prescribed time period at a time of starting up the electric actuator. Thereby, the amount of correction by the correcting unit can be freely selected, and a waste in the energy consumption can be minimized by terminating the boosting of the control value after elapsing of the period selected for the electric actuator to be able to start off.

According to yet another aspect of the present invention, the rear wheel toe angle control system of the present invention may further comprise a start up condition detecting unit (17) for detecting a start up condition of the electric actuator, the correcting unit being configured to continue correcting the control value until the electric actuator has started moving at a start up thereof. Thereby, the time period for the boost up correction can be minimized, and waste in the energy consumption can be avoided. Furthermore, when the electric actuator fails to be started up for any incidental cause in spite of the boosting of the control value, the electric actuator can be restarted in a reliable manner once the cause is removed.

According to yet another aspect of the present invention, the correcting unit (120) is configured to correct the control value by computing a correction term (K×dδrtgt) by multiplying a coefficient (K) to a differentiated value (dδrtgt) of the target rear wheel toe angle, and adding the correction term to the target rear wheel toe angle (δrtgt). By thus adding the correction term based on the differentiated value of the target rear wheel toe angle by feed forward to the target rear wheel toe angle, the target rear wheel toe angle is advanced in phase so that the delay in the tracking performance can be avoided even when the load on the electric actuator is increased.

According to yet another aspect of the present invention, the electric actuator consists of a linear actuator, and an axial force detector (16) for detecting an axial force (Fa) of the electric actuator is provided on the electric actuator, the correcting unit (160) being configured to correct the control value by computing a correction term (K×dδrtgt) that depends on the axial force of the electric actuator, and adding the correction term to the target rear wheel toe angle (δrtgt). By thus adding the correction term that depends on the axial force of the electric actuator by feed forward to the target rear wheel toe angle, the target rear wheel toe angle is advanced in phase depending the axial force of the electric actuator which may vary depending on the running condition of the vehicle so that the delay in the tracking performance can be avoided even when the load on the electric actuator is increased.

According to yet another aspect of the present invention, the correcting unit is configured to correct the control value by computing a correction term (K×dδrtgt) by multiplying a coefficient (K) based on the axial force of the electric actuator to a differentiated value of the target rear wheel toe angle, and adding the correction term to the target rear wheel toe angle (δrtgt). By thus adding a correction term that depends on the actuating speed of the electric actuator and the axial force of the electric actuator to the target rear wheel toe angle, the delay in the tracking performance can be improved without regard to the operating condition of the electric actuator and the running condition of the vehicle.

Effect of the Invention

According to the present invention, even when the axial force acting on the electric actuator changes depending on the running condition of the vehicle, the performance of the system in tracking the target rear wheel toe angle is prevented from being impaired, and the vehicle behavior can be stabilized.

DETAILED DESCRIPTION OF THE PREFERRED EMBODIMENT(S)

A motor vehicle V incorporated with a rear wheel toe angle variable control unit 10 embodying the present invention is described in the following with reference to the appended drawings. In the following description, each wheel and the associated tire and electric actuator are denoted with corresponding numerals followed by a letter L or R depending on which side of the vehicle the particular component is located. For instance, the left and rear wheels are denoted with 5L and 5R, respectively. When such components are collectively referred to, they are denoted with the corresponding numeral. For instance, the rear wheels may be denoted simply with numeral 5.

Figure 1:
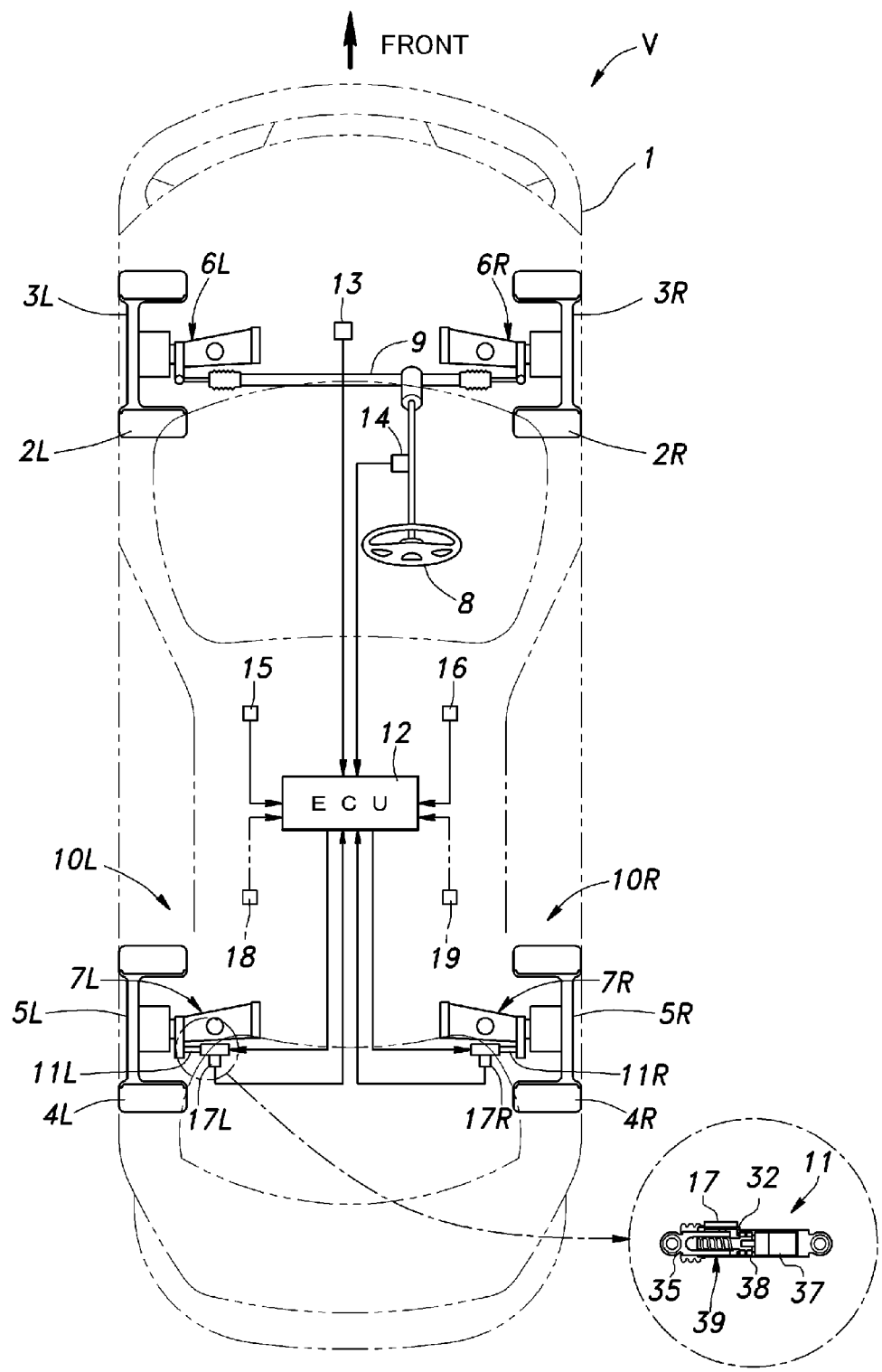
FIG. 1 is a simplified plan view of the overall structure of a four wheeled vehicle embodying the present invention.

Referring to FIG. 1, the motor vehicle V comprises a pair of front wheels 3L and 3R fitted with tires 2L and 2R, and a pair of rear wheels 5L and 5R fitted with tires 4L and 4R, and these wheels are supported by the vehicle body 1 via corresponding suspension systems 6L, 6R, 7L and 7R.

The motor vehicle V is further provided with a front wheel steering device 9 that directly steers the left and right front wheels 3L and 3R in dependence on the steering angle of a steering wheel 8 via a rack and pinion mechanism, and a pair of rear wheel toe angle variable control units 10L and 10R that individually change the toe angle δr of the left and right rear wheels 5L and 5R by extending and retracting electric actuators 11L and 11R incorporated in the corresponding wheel suspension systems 7L and 7R, respectively.

The electric actuator 11 incorporated in each rear wheel toe angle variable control unit 10 may consist of a per se known linear actuator, and the detailed description thereof is omitted in this disclosure. The electric actuator disclosed in patent document 3, for instance, may be used for the present invention. As shown in an enlarged view included in FIG. 1, the electric actuator 11 may comprise a brush-type DC electric motor 37 received in a housing 32 attached to the vehicle body and configured to be pulse width modulation (PWM) controlled, a reduction gear unit 38 interposed between the output shaft of the DC motor 37 and the male thread of a feed screw mechanism 39, and an output rod 35 formed with the female thread of the feed screw mechanism 39 and connected to the corresponding rear wheel 5.

The motor vehicle V is provided with an ECU (electronic control unit) 12 for controlling the overall operation of the various onboard systems, a vehicle speed sensor 13, a front wheel steering angle sensor 14, a yaw rate sensor 15, a lateral acceleration sensor 16 and other sensors that are not shown in the drawings. The detection signals of the various sensors are forwarded to the ECU 12 for the purpose of controlling the various control actions of the motor vehicle V. The front wheel steering angle sensor 14 detects the steering angle of the steering wheel 8, and the front wheel steering angle δf is computed from the detection signal of the front wheel steering angle sensor 14. The lateral acceleration sensor 16 detects the lateral acceleration Gy of the vehicle body 1. The ECU 12 forms an essential part of the rear wheel toe angle variable control unit 10, and the lateral acceleration sensor 16 forms an essential part of the axial force detecting unit for detecting the axial force Fa of the electric actuator 11.

Each electric actuator 11L, 11R is fitted with a rear wheel toe angle sensor 17L, 17R for detecting the stroke position of the output rod 35 thereof. Each rear wheel toe angle sensor 17 detects the stroke of the corresponding electric actuator 11 by detecting the displacement of a permanent magnet placed on the output rod 35 with a differential transformer mounted on the vehicle body adjacent to the permanent magnet, and the ECU 12 receives the output signal of the rear wheel toe angle sensor 17L, 17R to compute the actual rear wheel toe angle δract therefrom.

The ECU 12 essentially consists of a computer, and comprises a processor (CPU) for executing various arithmetic computations, random access memory (RAM) for provided a storage area for temporarily storing various kinds of data and a work area for the CPU to execute the arithmetic computations, read only memory (ROM) for storing the programs to be executed by the CPU and various kinds of data that are required for the arithmetic computations, re-writable non-volatile memory for storing the results of the arithmetic computations and some of the data obtained from various parts of the engine, drivers, a peripheral circuit and an input/output interface. The ECU 12 is connected to the various sensors 13 to 17 and electric actuators 11 via a communication line which consists of a CAN (controlled area network) in the illustrated embodiment so that the electric actuators 11L and 11R are PWM controlled for the toe angle control of the left and right rear wheels 5L and 5R according to the detection signals of the various sensors 13 to 16.

In this motor vehicle V incorporated with the system described above, the toe in and toe out of the two rear wheels 5L and 5R can be freely adjusted for each given condition by suitably displacing the two electric actuators 11L and 11R in a symmetric fashion, and the two rear wheels can be steered either to the right or to the left by extending one of the electric actuators 11L, 11R while retracting the other actuator 11L, 11R. More specifically, with the aim of improving the driving stability of the motor vehicle V, the ECU 12 may actuate the rear wheels 5 to a toe out condition in acceleration and to a toe in condition in deceleration, and/or may steer the rear wheels 5 in the same phase as the front wheels 3 when making a turn at a speed higher than a prescribed threshold speed and in the opposite phase to the front wheels 3 when making a turn at a speed lower than the prescribed threshold speed.

First Embodiment

Figure 2:
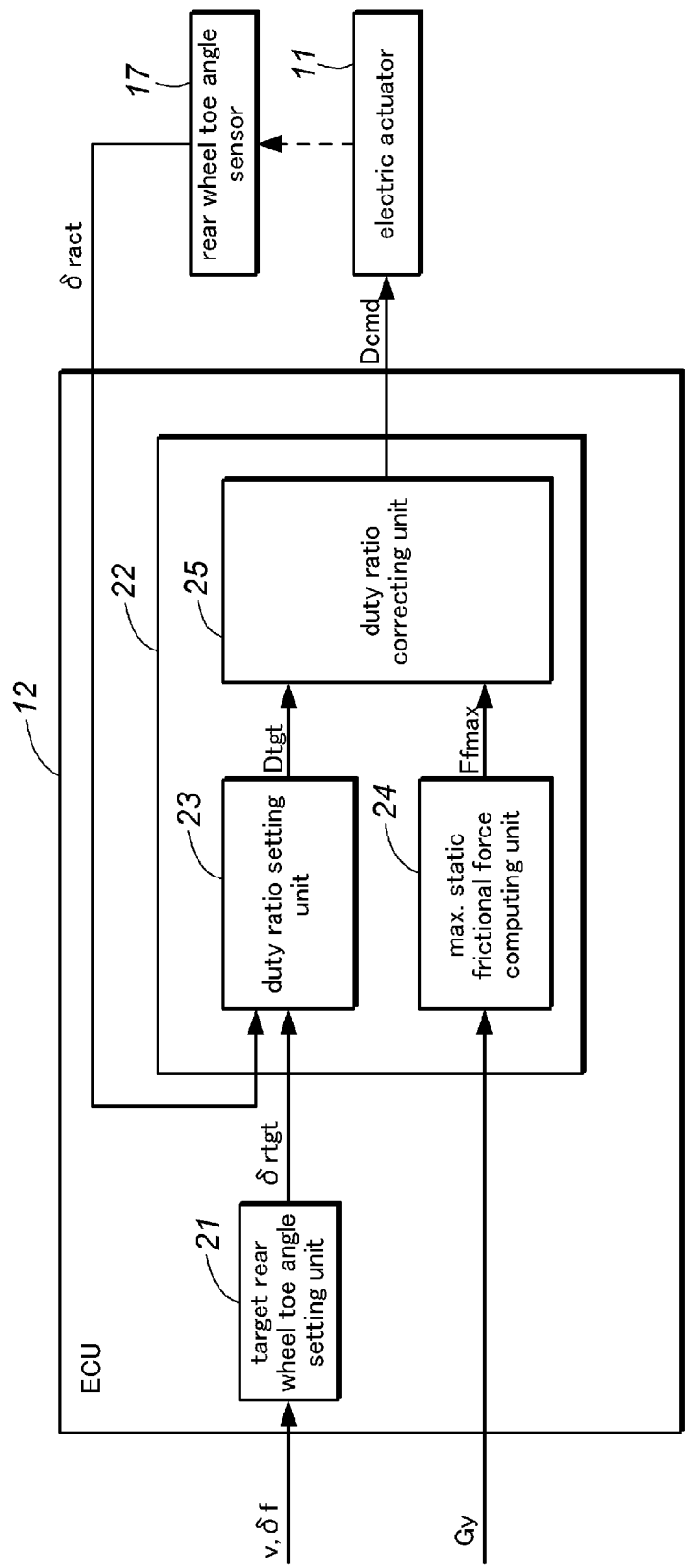
FIG. 2 is a block diagram showing the overall structure of a rear wheel toe angle control system given as a first embodiment of the present invention.

The first embodiment of the present invention is described in the following with reference to FIGS. 2 to 5. The rear wheel toe angle control system of the first embodiment is implemented by the ECU 12. FIG. 2 shows an essential part of the present embodiment which comprises a target rear wheel toe angle setting unit for setting the target rear wheel toe angle of the left and right rear wheels of the motor vehicle, and a state variable detecting unit for detecting vehicle state variables representing the behavior of the vehicle similarly as that disclosed in patent document 1. The general structure of the rear wheel toe angle control system that changes the toe angle of the left and right rear wheels according to the deviation of the detected actual rear wheel toe angle from the target rear wheel toe angle may be omitted in the following disclosure. In the appended drawings, the electric actuator 11 and associated component parts may be described in the following without identifying if they are located on the left hand side or right hand side of the motor vehicle V because the ECU 12 performs a similar function for both the left and right electric actuators 11, and controls the left and right electric actuators 11 in a similar fashion. The same is true with the second embodiment. Also, in the following disclosure, to distinguish the duty ratio D before and after a correction process, the duty ratio D before the correction process is referred to as "target duty ratio Dtgt", and the duty ratio D after the correction process is referred to as "commanded duty ratio Dcmd".

As shown in FIG. 2, the ECU 12 includes a target rear wheel toe angle setting unit 21 that determines a target rear wheel toe angle δrtgt according to the vehicle speed v and front wheel steering angle δf received from the corresponding sensors via an input interface not shown in the drawing, and a PID control unit 22 that determines a control command value (duty ratio D) according to the actual rear wheel toe angle δract detected by the rear wheel toe angle sensor 17 and the target rear wheel toe angle δrtgt, and controls the actuation of the electric actuator 11 according to the determined control command value.

The PID control unit 22 comprises a duty ratio setting unit 23, a maximum static frictional force computing unit 24 and a duty ratio correcting unit 25. The duty ratio setting unit 23 determines the target duty ratio Dtgt for the PWM control according to the deviation e of the actual rear wheel toe angle δract detected by the rear wheel toe angle sensor 17 from the target rear wheel toe angle δrtgt, the integral value of the deviation e and the differential value of the deviation e.

Figure 3:
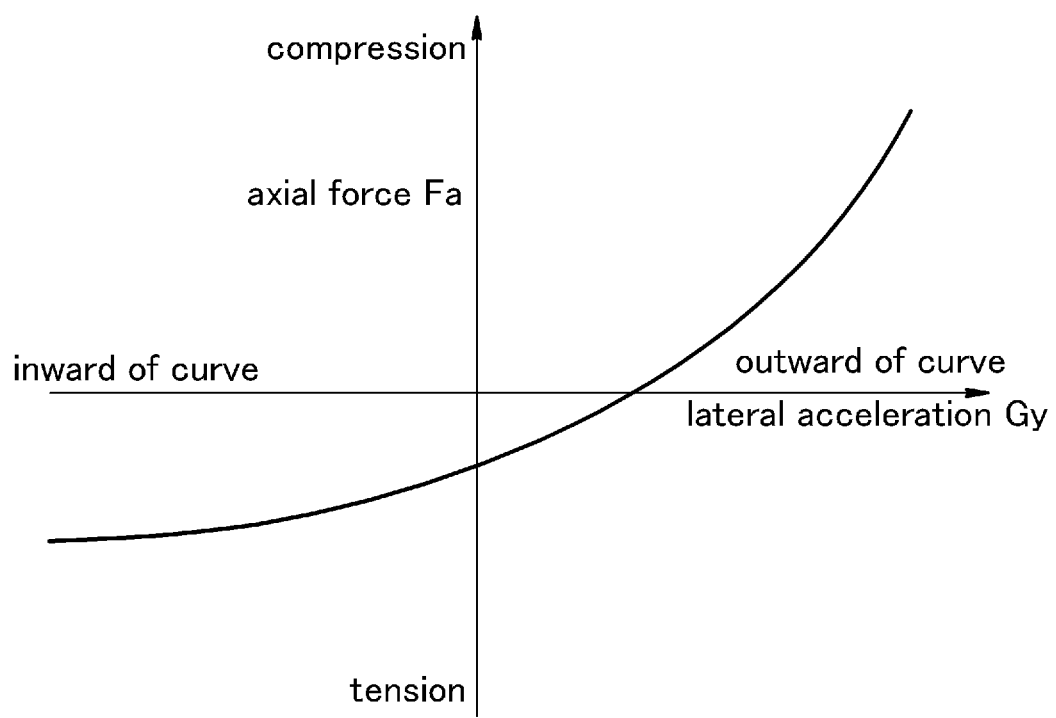
FIG. 3 represents a map showing the relationship between the axial force of the electric actuator and the lateral acceleration in the first embodiment of the present invention.

The maximum static frictional force computing unit 24 estimates the axial force Fa acting on the electric actuator 11 (feed screw mechanism 39) according to the lateral acceleration Gy detected by the lateral acceleration sensor 16, and computes the maximum static frictional force Ffmax by multiplying the static frictional coefficient μ of the feed screw mechanism 39 to the estimated axial force Fa. The axial force Fa is estimated by looking up a map representing the relationship between the lateral acceleration Gy and the axial force Fa of the electric actuator 11 for the given suspension geometry of the rear suspension system 7, by using the lateral acceleration Gy as the index. For instance, when the electric actuator 11 is provided on the same side (either front side or rear side) of the king pin of the rear wheel 5 as the contact area of the tire 4 to which the lateral acceleration acts, the greater the lateral acceleration Gy which is directed outward of the curve is, the greater the compressive (retracting) axial force Fa becomes, as shown in FIG. 3. When the vehicle is traveling straight ahead or when the lateral acceleration Gy is zero, because the suspension geometry involves a slight positive camber, the axial force Fa consists of a slight tension (extension).

The duty ratio correcting unit 25 compares the target duty ratio Dtgt with the lower limit of the duty ratio that is required for the electric actuator 11 to overcome the load at the time of start up or for the output F of the DC motor 37 to be greater than the maximum static frictional force Ffmax (start up duty ratio Ds). If the target duty ratio Dtgt is smaller than the start up duty ratio Ds, the target duty ratio Dtgt is corrected to the value of the start up duty ratio Ds, or the duty ratio D is boosted up. The duty ratio correcting unit 25 then forwards the commanded duty ratio Dcmd obtained by this correction process to the electric actuator 11.

The start up condition that causes the duty ratio correcting unit 25 to carry out the correction process may be defined not only as the completion of the first PWM cycle as counted from the stand still condition where the duty ratio is zero but also as the completion of any number of initial PWM cycles or as the elapsing of any period of time from the stand still condition, and may be selected in dependence on the property of the electric actuator 11. In the illustrated embodiment, the time period of about 100 ms is defined as the time period of the start up.

Figure 4:
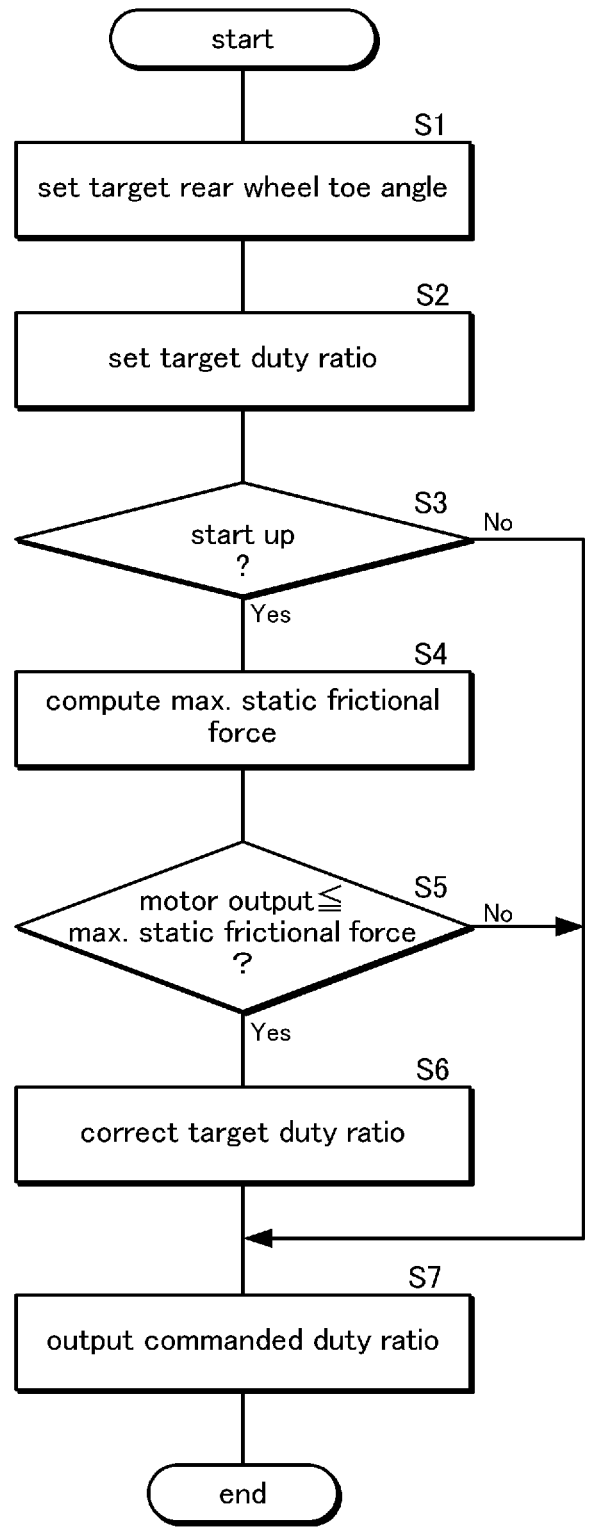
FIG. 4 is a flowchart of the target duty ratio correction process used in the first embodiment of the present invention.

The target duty ratio correction process by the ECU 12 is described in the following with reference to FIG. 4. Once the engine of the vehicle 12 is started, the ECU 12 repeats the following target duty ratio correction process at a prescribed cycle time. First of all, in the ECU 12, the target rear wheel toe angle setting unit 21 determines the target rear wheel toe angle δrtgt (step S1), and the duty ratio setting unit 23 determines the target duty ratio Dtgt according to the target rear wheel toe angle δrtgt and the actual rear wheel toe angle δract (step S2). The duty ratio correcting unit 25 of the ECU 12 determines if the electric actuator 11 is in the start up condition (step S3). If the electric actuator 11 is not in the start up condition (No in step S3), the target duty ratio Dtgt determined in step S2 is forwarded as the commanded duty ratio Dcmd (step S7), and the current process is terminated.

On the other hand, if the electric actuator 11 is in the start up condition (Yes in step S3), the maximum static frictional force computing unit 24 of the ECU 12 estimates the axial force Fa of the electric actuator 11 according to the lateral acceleration Gy, and computes the maximum static frictional force Ffmax of the feed screw mechanism 39 of the electric actuator 11 from the estimated axial force Fa (step S4). The duty ratio correcting unit 25 of the ECU 12 determines if the output F of the DC motor 37 based on the target duty ratio Dtgt is smaller than the maximum static frictional force Ffmax (step S5). If the output F is greater than the maximum static frictional force Ffmax (No in step S5), the target duty ratio Dtgt determined in step S2 is produced as the commanded duty ratio Dcmd (step S7), and the current process is terminated.

If the output F is smaller than the maximum static frictional force Ffmax (Yes in step S5), the duty ratio correcting unit 25 corrects the target duty ratio Dtgt to the start up duty ratio Ds corresponding to the maximum static frictional force Ffmax so that the electric actuator 11 may be able to overcome the load thereto (step S6), and produces the corrected commanded duty ratio Dcmd (step S7) before terminating the current process.

Figure 5:
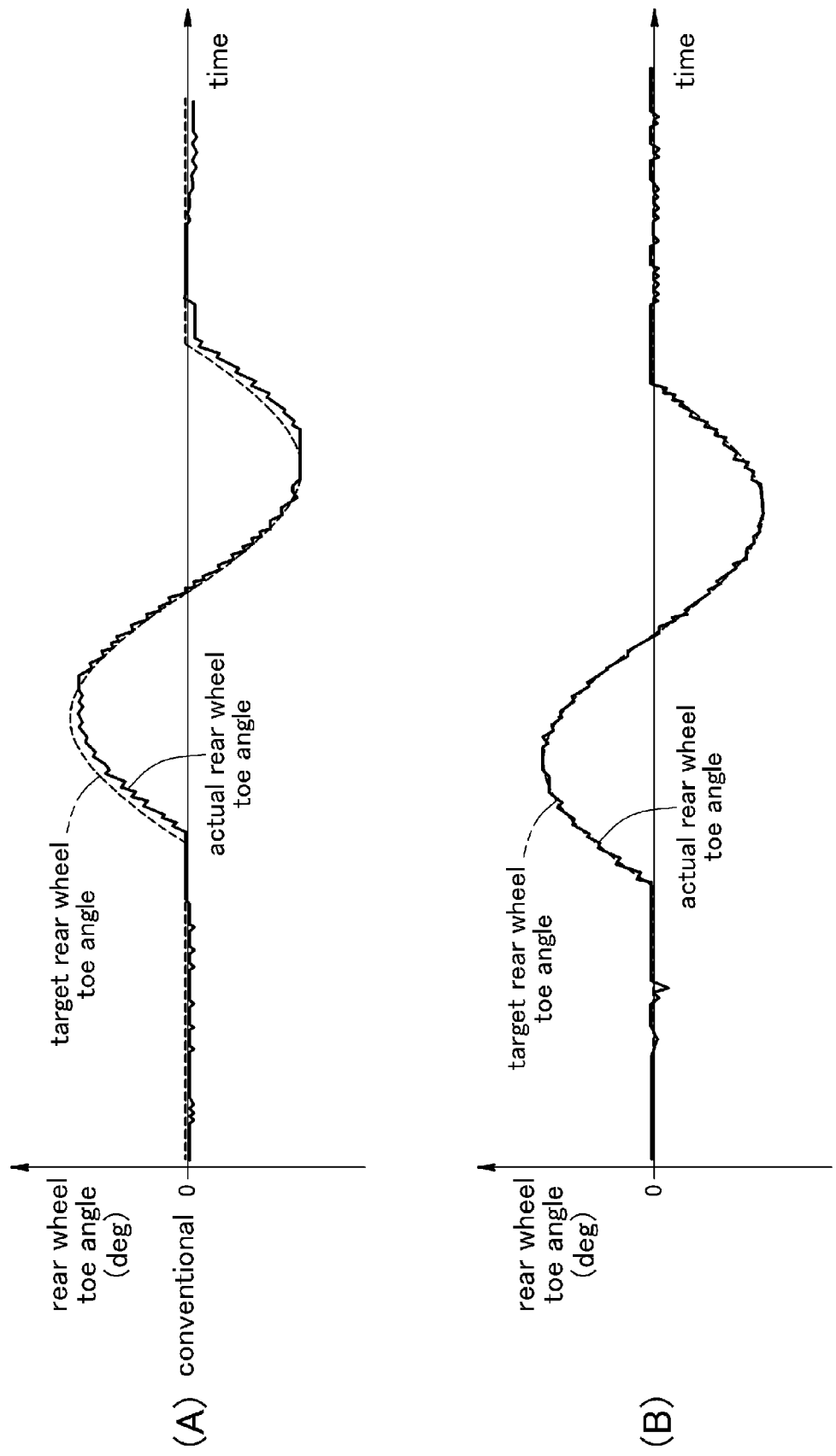
FIGS. 5(A) and 5(B) is a time chart showing the response of the rear wheel toe angle in the rear wheel toe angle control system of the first embodiment of the present invention.

The mode of operation of the rear wheel toe angle variable control unit 10 of the foregoing embodiment is described in the following with reference to FIG. 5. FIG. 5 is a time chart where the change in the rear wheel toe angle δr (ordinate) with time (abscissa) is shown. (A) indicates the change in the rear wheel toe angle δr as the vehicle V provided with a conventional rear wheel toe angle variable control system makes a turn, and (B) indicates the change in the rear wheel toe angle δr as the vehicle V provided with the rear wheel toe angle variable control system of the foregoing embodiment makes a turn. As shown in these time charts, in the conventional rear wheel toe angle variable control system, there is a certain phase delay between the target rear wheel toe angle δrtgt and actual rear wheel toe angle δract so that an initial delay at the start of the operation impairs the response property of the electric actuator 11. On the other hand, according to the rear wheel toe angle variable control unit 10 embodying the present invention, the target rear wheel toe angle δrtgt and actual rear wheel toe angle bract substantially coincide with each other so that the electric actuator 11 demonstrates a highly favorable response property.

As can be appreciated from the foregoing discussion, by correcting the target duty ratio Dtgt at the start up of the electric actuator 11 such that the commanded duty ratio Dcmd may not be smaller than the start up duty ratio Ds, the electric actuator 11 is enabled to operate properly immediately following the stand still condition. By computing the start up duty ratio Ds according to the axial force Fa of the electric actuator 11 which can be obtained from the lateral acceleration Gy, and correcting the target duty ratio Dtgt so that the commanded duty ratio Dcmd may not be smaller than the start up duty ratio, the response property of the motor vehicle V can be improved even when the motor vehicle V is making a turn without being affected by the operating condition of the motor vehicle V. By thus allowing the rear wheel toe angle δr to be changed in a highly responsive manner, the rear wheel toe angle variable control unit 10 is enabled to improve the motion stability of the motor vehicle V in a favorable manner.

Second Embodiment

The second embodiment of the present invention is described in the following with reference to FIGS. 6 to 10.

Figure 6:
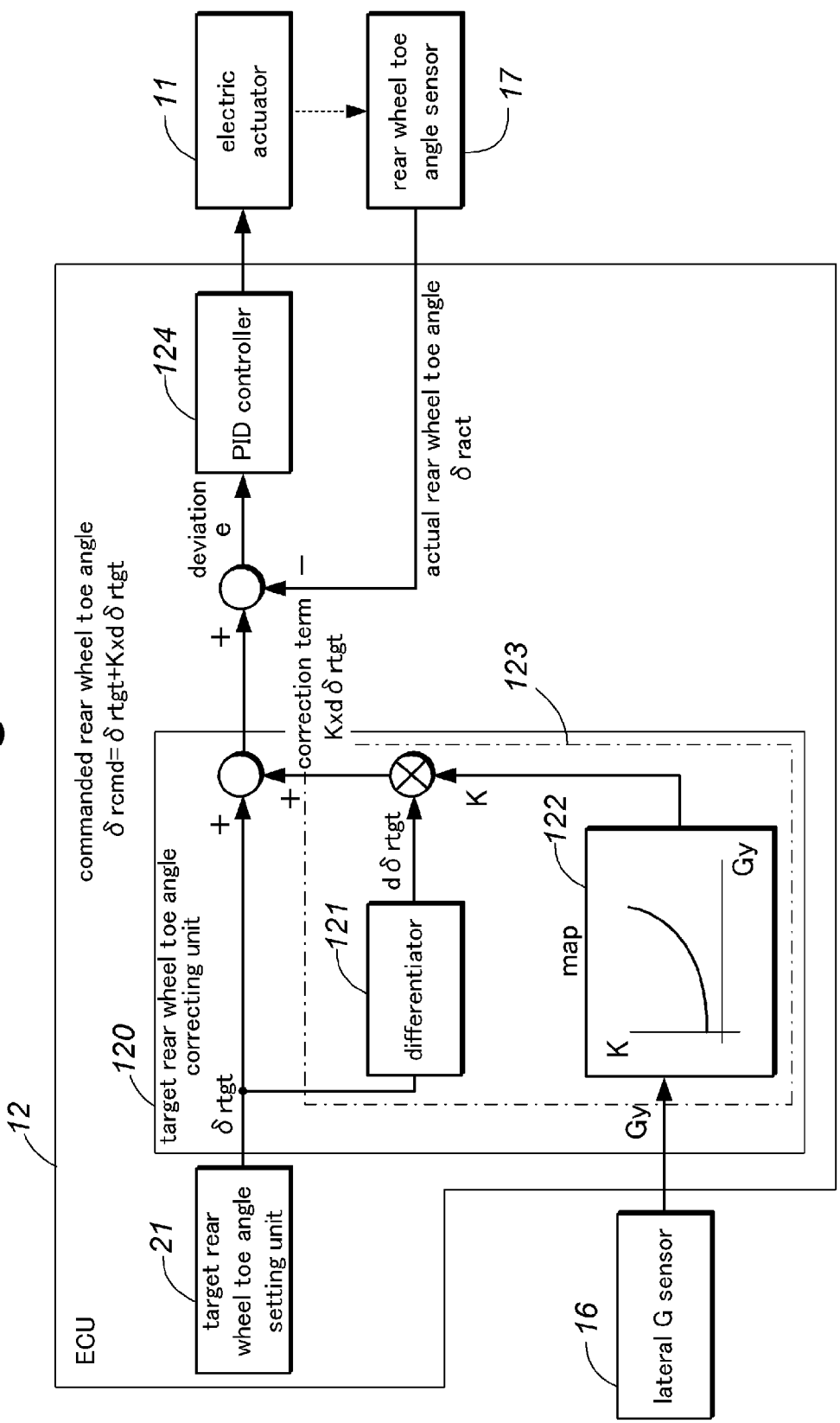
FIG. 6 is a block diagram showing the overall structure of a rear wheel toe angle control system given as a second embodiment of the present invention.

The rear wheel toe angle control system of the second embodiment is also implemented by the ECU 12. FIG. 6 also shows an essential part of the present embodiment which comprises a target rear wheel toe angle setting unit for setting the target rear wheel toe angle of the left and right rear wheels of the motor vehicle, and a state variable detecting unit for detecting vehicle state variables representing the behavior of the vehicle similarly as that disclosed in patent document 1. The general structure of the rear wheel toe angle control system that changes the toe angle of the left and right rear wheels according to the deviation of the detected actual rear wheel toe angle from the target rear wheel toe angle may be omitted in the following disclosure. Also, in the following disclosure, to distinguish the target rear wheel toe angle before and after a correction process, the target rear wheel toe angle before the correction process is referred to as "target rear wheel toe angle δrtgt", and the target rear wheel toe angle after the correction process is referred to as "commanded rear wheel toe angle δrcmd".

Referring to FIG. 6, the ECU 12 computes a target rear wheel toe angle δrtgt according to the vehicle speed v and front wheel steering angle δf received via an input interface not shown in the drawing, and the computed target rear wheel toe angle δrtgt is forwarded to a target rear wheel toe angle correcting unit 120 provided in the ECU 12. In FIG. 6, either one of the left and right rear wheels 5L and 5R represents both of the rear wheels, and is therefore denoted without any suffix that indicates the left hand side and right hand side of the vehicle body.

The ECU 12 receives the output signal of the lateral acceleration sensor 16 representing the lateral acceleration Gy which is one of the state variables of the vehicle that represent the behavior of the motor vehicle V. The received lateral acceleration Gy is forwarded to the target rear wheel toe angle correcting unit 120.

The target rear wheel toe angle δrtgt is determined from the front wheel steering angle δf, the vehicle speed v and other data, and makes transient changes during a turn. The greater the transient changes of the target rear wheel toe angle δrtgt are, the greater the load on the electric actuator 11 becomes. The increase in the load on the electric actuator 11 may impair the response property of the actual rear wheel toe angle δract in following the target rear wheel toe angle δrtgt. Therefore, the differential value of the target rear wheel toe angle δrtgt may be considered as a measure of the change in the tracking performance of the rear wheel toe angle. Thus, the target rear wheel toe angle correcting unit 120 differentiates the received target rear wheel toe angle δrtgt by using a differentiator 121, and produces a differential value dδrtgt.

The target rear wheel toe angle correcting unit 120 looks up a coefficient K corresponding to the received lateral acceleration Gy from a map 122 defining a relationship between the received lateral acceleration Gy and the coefficient K. The coefficient K is multiplied to the differential value dδrtgt of the target rear wheel toe angle δrtgt to produce a correction term K×dδrtgt. In other words, the correction term K×dδrtgt is proportional to the differential value dδrtgt of the target rear wheel toe angle.

Figure 7A:
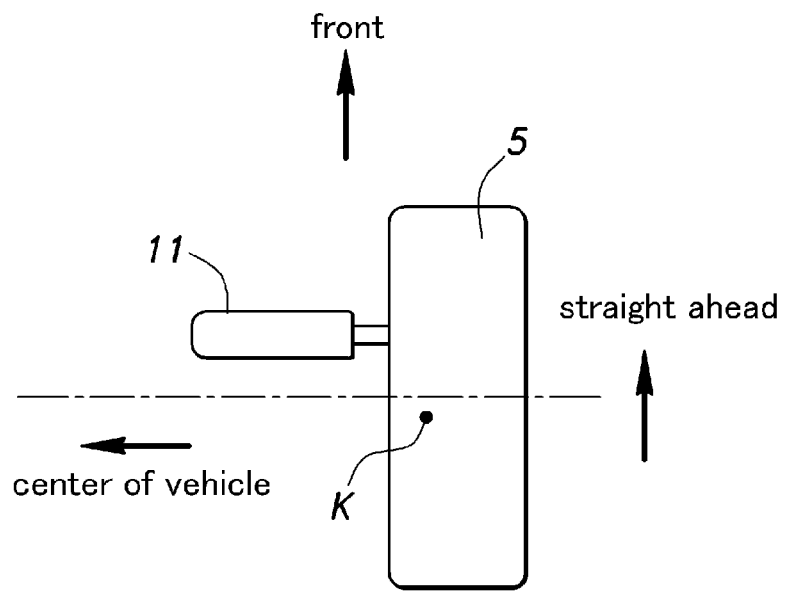
FIGS. 7a and 7b are diagrams showing the load of the electric actuator for controlling the rear wheel toe angle when the vehicle is traveling straight ahead and making a turn in the second embodiment of the present invention, respectively.
Figure 7B:
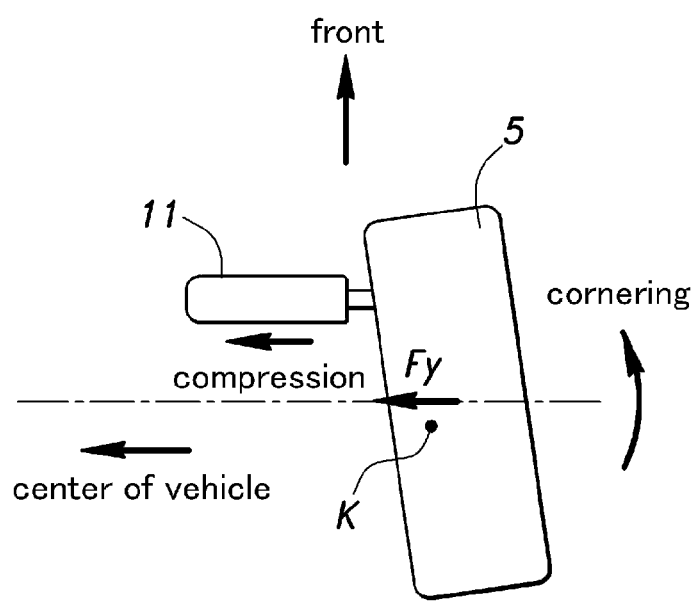

The meaning of the coefficient K is discussed in the following with reference to FIGS. 7 to 9. FIGS. 7a and 7b show the load on the electric actuator 11 for controlling the rear wheel toe angle δr when the vehicle is traveling straight ahead and when the vehicle is making a turn in the second embodiment of the present invention, respectively. The vehicle V is shown in plan view, and the relationship between the rear wheel 5 and electric actuator 11 is emphasized. In FIGS. 7a and 7b, the upper end of the drawing corresponds to the front end of the vehicle V, and the left hand side of the drawing corresponds to the center of the vehicle V. The electric actuator 11 is provided on the font side of the axial line of the rear wheel 5 indicated by a chain dot line, and the king pin K is located on the rear side of the axial line of the rear wheel 5.

Referring to FIG. 7a, when the vehicle is traveling straight ahead, the electric actuator 11 can change the toe angle of the rear wheel by producing an axial force of a prescribed magnitude. However, as shown in FIG. 7b, when the vehicle V is making a turn, and the rear wheel 5 is subjected to a tire lateral force Fy, as the contact area of the tire that produces a lateral force directed in the axial direction of the rear wheel and the electric actuator 11 are located to the front of the king pin K in the present case, a compressive load is applied to the electric actuator 11. Thus, the axial force Fa of the electric actuator 11 changes depending on the tire lateral force Fy.

Figure 8:
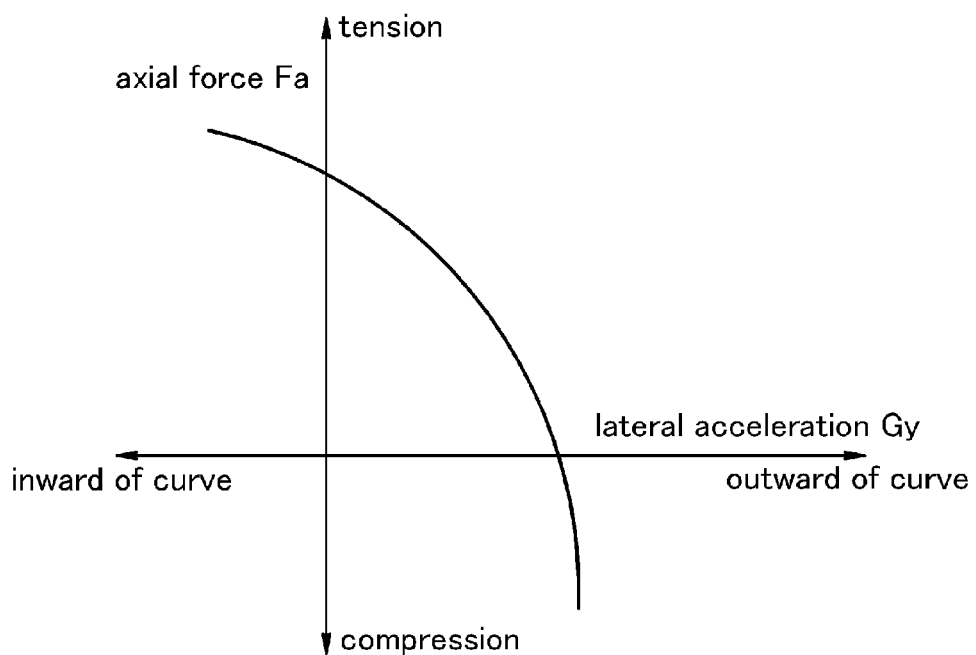
FIG. 8 is a chart showing the relationship between the axial force of the electric actuator and the lateral acceleration in the second embodiment of the present invention.

FIG. 8 shows the relationship between the lateral acceleration Gy and the axial force Fa of the electric actuator 11 in the arrangement illustrated in FIGS. 7a and 7b where the electric actuator 11 is subjected to a tensile axial force Fa under a normal condition. As shown in FIG. 8, when the lateral acceleration Gy is directed toward the outer wheel as in the case illustrated in FIG. 7b, the axial force Fa of the electric actuator 11 moves from tension to compression, and the increase rate of the axial force Fa of the electric actuator 11 with the increase in the lateral acceleration Gy increases with the increase in the lateral acceleration Gy. This owes to the fact that the lateral force that is born by the outer wheel increases as the centrifugal force causes the load to shift toward the outer wheel. In the case of the vehicle equipped with the conventional rear wheel toe angle control system, the rear wheel toe angle is controlled in such a manner that the actual rear wheel toe angle δract is made to track or follow the target rear wheel toe angle δrtgt computed from the front wheel steering angle δf, the vehicle speed v and other data, but the actual rear wheel toe angle δract may not closely track the target rear wheel toe angle δrtgt so much as desired owing to the changes in the axial force of the electric actuator 11 when the vehicle is making a turn.

Figure 9:
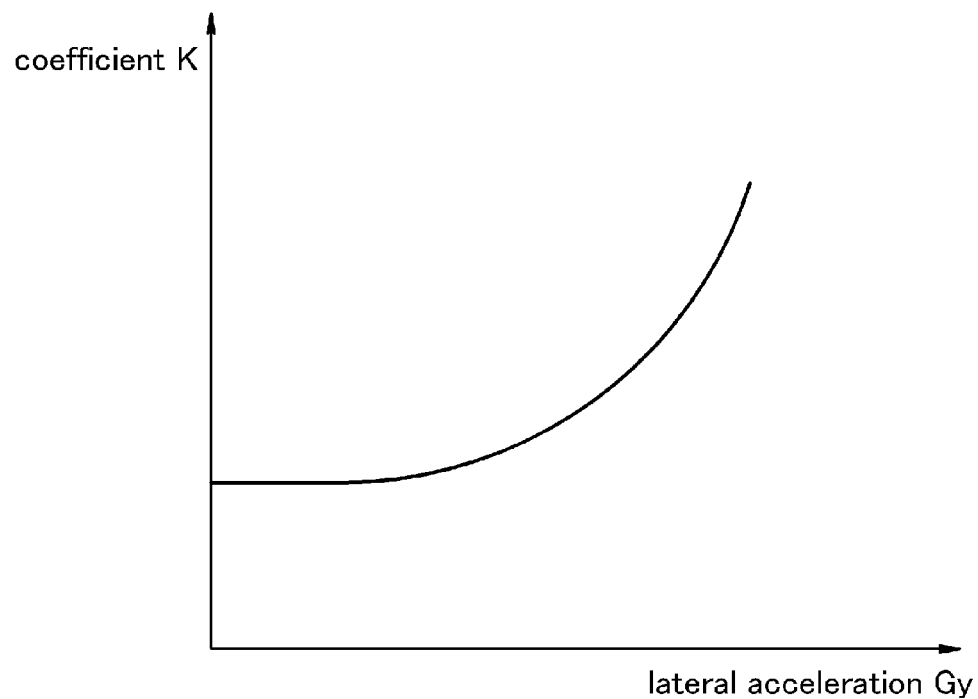
FIG. 9 is a chart (map) showing the relationship between the lateral acceleration and the coefficient that is to be multiplied to the target rear wheel toe angle in the second embodiment of the present invention.

Therefore, as shown in FIG. 9, the coefficient K is defined such that the control gain is increased as the axial force of the electric actuator 11 increases due to the cornering of the vehicle V according to the relationship between the lateral acceleration Gy and the axial force Fa of the electric actuator 11 which is shown in FIG. 8. By multiplying the coefficient K thus defined to the differential value dδrtgt of the target rear wheel toe angle, a correction term K×dδrtgt which accounts for the changes in the axial force Fa of the electric actuator 11 that depends on the lateral acceleration Gy can be obtained. FIG. 9 shows a map that can be stored in the memory of ECU 12 to produce a coefficient K for each given lateral acceleration.

Referring to the functional block diagram of FIG. 6 once again, the correction term K×dδrtgt is added to the target rear wheel toe angle δrtgt to produce the commanded rear wheel toe angle δrcmd. By adding the product of the differential value dδrtgt of the target rear wheel toe angle and the coefficient K or the correction term K×dδrtgt to the target rear wheel toe angle δrtgt by feed forward, a desired commanded rear wheel toe angle δrcmd which is appropriately advanced in phase with respect to the target rear wheel toe angle δrtgt can be obtained. In other words, the differentiator 121, the map 122 and other elements that are configured to compute the correction term K×dδrtgt form a load detection unit 123 for detecting the load to the electric actuator 11.

A deviation e is computed by subtracting the actual rear wheel toe angle bract detected by the rear wheel toe angle sensor 17 provided on the electric actuator 11 and forwarded to the ECU 12 via an input interface (not shown in the drawings) from the commanded rear wheel toe angle δrcmd. The deviation e is forwarded to a PID controller 124 which in turn produces, via an output interface (not shown in the drawings), a drive signal (duty ratio D) for actuating the electric actuator 11 so as to cancel this deviation e. By using the commanded rear wheel toe angle δrcmd which has the correction term K×dδrtgt added thereto by feed forward as the command signal for the electric actuator 11, the duty ratio D of the electric actuator 11 is boosted, and the delay in the tracking performance of the electric actuator 11 can be compensated.

Figure 10:
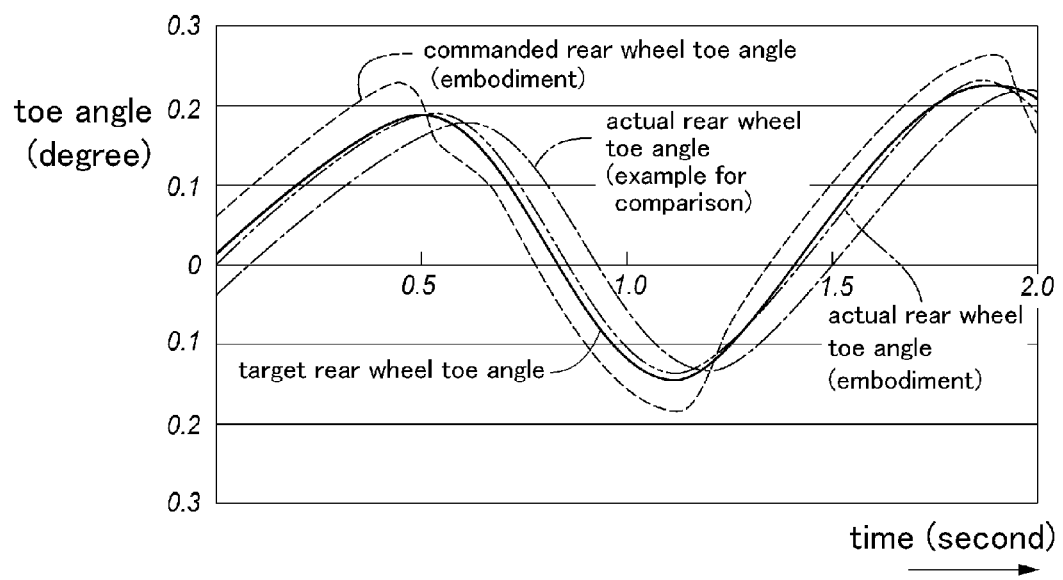
FIG. 10 is a time chart comparing relationship between the target rear wheel toe angle and the actual rear wheel toe angle in the second embodiment of the present invention and an example for comparison.

FIG. 10 is a graph comparing the behavior of the second embodiment of the present invention with that of an example for comparison essentially consisting of a vehicle incorporated with a conventional rear wheel toe angle control system. FIG. 10 essentially consists of a time chart comparing the embodiment of the present invention with the example for comparison with regard to the relationship between the target rear wheel toe angle δrtgt, the commanded rear wheel toe angle δrcmd and the actual rear wheel toe angle δract.

Referring to FIG. 10, in the case of the example for comparison, the actual rear wheel toe angle δract indicated by the chain dot line demonstrates some phase delay with respect to the target rear wheel toe angle δrtgt indicated by the solid line. On the other hand, in the case of the embodiment of the present invention, by using the commanded rear wheel toe angle δrcmd (indicated by the dotted line) obtained by correcting the target rear wheel toe angle δrtgt so as to advance the phase thereof, the actual rear wheel toe angle bract indicated by the double dot chain dot line is allowed to coincide with the target rear wheel toe angle δrtgt, or the phase delay is eliminated. Thus, according to the rear wheel toe angle control system embodying the present invention, even when the axial force acting on the electric actuator 11 for steering the rear wheel changes when the vehicle makes a turn, by executing a PID control by using the commanded rear wheel toe angle δrcmd obtained by adding the correction term K×dδrtgt to the target rear wheel toe angle δrtgt, as a feed forward process, the actual rear wheel toe angle bract is allowed to track the target rear wheel toe angle δrtgt, and the four wheel steering vehicle is enabled to provide a highly stable dynamic performance.

The preferred embodiments of the present invention have been described, but the present invention is not limited by the foregoing embodiments, but may be implemented in a number of different ways without departing from the spirit of the present invention. For instance, the lateral acceleration Gy was used for the detection of the axial force Fa of the electric actuator 11 in the first embodiment, but it is also possible to provide a fore and aft acceleration sensor 18 on the vehicle V, and the changes in the axial force of the electric actuator owing to the fore and aft acceleration may be accounted for. Alternatively, the change in the axial force owing to the lift of the vehicle body 1 in dependence on the vehicle speed may be accounted for. If desired, the system may be provided with a road surface condition detecting unit 19 for detecting the road surface condition such as the frictional coefficient of the road surface and account for the changes in the axial force owing to the road condition. The road surface condition detecting unit 19 may consist of a road surface frictional coefficient measuring device for directly measuring the frictional coefficient of the road surface, a road surface frictional coefficient estimating device for estimating the road surface frictional coefficient by using a non-contact measurement such as imaging measurement and laser measurement or a road surface irregularity detecting device for detecting the irregularities in the road surface by using a vertical acceleration sensor, among other possibilities.

In the first embodiment, the drive source of the electric actuator 11 consisted on a DC motor 37, and the DC motor 37 was PWM controlled. However, it is also possible to directly control the applied DC voltage or the start up current, or to use an AC motor. In the first embodiment, the axial force Fa was estimated from the lateral acceleration Gy, and the maximum static frictional force Ffmax was computed from the estimated axial force Fa. However, it is also possible to directly compute the maximum static frictional force Ffmax from the running condition value of the vehicle V or to look up the maximum static frictional force Ffmax from a map.

In the first embodiment, the target duty ratio Dtgt at the time of start up was corrected to the value of the start up duty ratio Ds without regard to the direction of the axial force Fa acting on the electric actuator. However, it is also possible to change the value of the start up duty ratio Ds and/or change the time period of correction at the time of start up depending on the direction of the axial force Fa. Also, the target duty ratio Dtgt may be set to be greater than the start up duty ratio Ds by a prescribed amount or by a prescribed factor. In the first embodiment, the target duty ratio Dtgt was corrected to the start up duty ratio Ds only when the output F of the DC motor 37 is smaller than the maximum static frictional force Ffmax. However, it is also possible to always use a duty ratio greater than a prescribed level at the start up even when the maximum static frictional force Ffmax is small.

In the first embodiment, the duty ratio correcting unit 25 corrected the target duty ratio Dtgt for a prescribed period of time at the time of start up. However, the duty ratio correcting unit 25 may correct the target duty ratio Dtgt only until the movement of the electric actuator 11 is detected. Thereby, the time period of correction by the duty ratio correcting unit 25 is minimized so that the waste in the consumption of energy may be avoided. Also, according to this arrangement, when the electric actuator fails to be started up for any incidental cause in spite of the use of the corrected commanded duty ratio Dcmd, the electric actuator 11 can be restarted in a reliable manner once the cause is removed.

The relationship between the lateral acceleration Gy and the coefficient K was given by a map as shown in FIG. 9 in the second embodiment of the present invention. It is also possible to obtain the lateral load of the vehicle by applying a delay filter to the output of the front wheel steering angle sensor, and the map may show the relationship between this lateral load and the corresponding coefficient. These and other changes can be made to the concrete structure and arrangement of the various devices and units of the present invention without departing from the scope and spirit of the present invention.

GLOSSARY 1 vehicle body
5 rear wheel
10 rear wheel toe angle variable control system
11 electric actuator
12 ECU (rear wheel toe angle variable control unit)
13 vehicle speed sensor
16 lateral acceleration sensor (axial force detecting unit)
17 rear wheel toe angle sensor (rear wheel toe angle detecting unit, start up detecting unit)
18 fore and aft acceleration sensor
19 road surface condition detecting unit
21 target rear wheel toe angle setting unit 22 PID control unit (drive control unit)
24 maximum static frictional force computing unit (load detecting unit)
25 duty ratio correcting unit (correcting unit)
37 DC motor
39 feed screw mechanism
120 target rear wheel toe angle correcting unit (correcting unit)
123 load detecting unit
124 PID control unit (drive control unit)
V motor vehicle
δr rear wheel toe angle
δrtgt target rear wheel toe angle
dδrtgt differentiated value of target rear wheel toe angle
δrcmd commanded rear wheel toe angle
δract actual rear wheel toe angle
e deviation
D duty ratio (control value)
Dtgt target duty ratio
Dcmd commanded duty ratio
Ds start up duty ratio
Gy lateral acceleration
F motor output
Ffmax maximum static frictional force
K coefficient
K×dδrtgt correction term

The invention claimed is:

1. A rear wheel toe angle control system for changing a rear wheel toe angle of a vehicle by using an electric actuator, comprising:
a target rear wheel toe angle setting unit for setting a target rear wheel toe angle;
an actual rear wheel toe angle detecting unit for detecting an actual rear wheel toe angle;
a drive control unit that drives the electric actuator by a control value based on a difference between the target rear wheel toe angle and actual rear wheel toe angle;
a load detecting unit for detecting load acting upon the electric actuator; and
a correcting unit for correcting the control value according to the load acting on the electric actuator, wherein the electric actuator includes an electric motor and a power transmission mechanism, and the correcting unit is configured to correct the control value so that an output of the electric motor is greater than a maximum static frictional force of the power transmission mechanism that depends on the load acting on the electric motor.

2. The rear wheel toe angle control system according to claim 1, wherein the electric actuator consists of a linear actuator including a feed screw mechanism, and an axial force detector for detecting an axial force of the electric actuator is provided on the electric actuator, the load detecting unit being configured to detect the load of the electric actuator from the axial force of the electric actuator.

3. The rear wheel toe angle control system according to claim 2, wherein the axial force detector is configured to detect at least one of a lateral acceleration of a vehicle body, a fore and aft acceleration of the vehicle body, a vehicle speed and a road surface condition.

4. The rear wheel toe angle control system according to claim 1, wherein the control value comprises a duty ratio for PWM control.

5. The rear wheel toe angle control system according to claim 1, wherein the correcting unit is configured to correct the control value over a prescribed time period at a time of starting up the electric actuator.

6. The rear wheel toe angle control system according to claim 1, further comprising a start up condition detecting unit for detecting a start up condition of the electric actuator, the correcting unit being configured to continue correcting the control value until the electric actuator has started moving at a start up thereof.

7. The rear wheel toe angle control system according to claim 1, wherein the correcting unit is configured to correct the control value by computing a correction term by multiplying a coefficient to a differentiated value of the target rear wheel toe angle, and adding the correction term to the target rear wheel toe angle.

8. The rear wheel toe angle control system according to claim 7, wherein the electric actuator consists of a linear actuator, and an axial force detector for detecting an axial force of the electric actuator is provided on the electric actuator, the correcting unit being configured to correct the control value by computing a correction term that depends on the axial force of the electric actuator, and adding the correction term to the target rear wheel toe angle.

9. The rear wheel toe angle control system according to claim 8, wherein the correcting unit is configured to correct the control value by computing a correction term by multiplying a coefficient based on the axial force of the electric actuator to a differentiated value of the target rear wheel toe angle, and adding the correction term to the target rear wheel toe angle.

* * * * *